United States Patent [19]
Patton et al.

[11] Patent Number: 6,144,415
[45] Date of Patent: Nov. 7, 2000

[54] APPARATUS FOR SAMPLING AND DISPLAYING AN AUXILIARY IMAGE WITH A MAIN IMAGE TO ELIMINATE A SPATIAL SEAM IN THE AUXILIARY IMAGE

[75] Inventors: Steven Wayne Patton, Littleton, Colo.; Mark Francis Rumreich; Donald Henry Willis, both of Indianapolis, Ind.

[73] Assignee: Thomson Licensing S.A., Boulogne Cedex, France

[21] Appl. No.: 09/125,320

[22] PCT Filed: Mar. 6, 1997

[86] PCT No.: PCT/US97/04783

§ 371 Date: Aug. 17, 1998

§ 102(e) Date: Aug. 17, 1998

[87] PCT Pub. No.: WO97/33429

PCT Pub. Date: Sep. 12, 1997

Related U.S. Application Data

[60] Provisional application No. 60/025,532, Sep. 6, 1996.

[30] Foreign Application Priority Data

| Mar. 7, 1996 | [GB] | United Kingdom | 9604857 |
| Oct. 25, 1996 | [GB] | United Kingdom | 9622193 |

[51] Int. Cl.[7] .................................................. H04N 5/44
[52] U.S. Cl. ........................ 348/565; 348/568; 348/584; 348/598
[58] Field of Search .................................... 348/565, 568, 348/584, 598

[56] References Cited

U.S. PATENT DOCUMENTS

| 5,159,453 | 10/1992 | Dhein et al. | 348/598 |
| 5,459,528 | 10/1995 | Pettitt | 348/568 |

FOREIGN PATENT DOCUMENTS

| 200330 | of 0000 | European Pat. Off. . | |
| 0200330 | 10/1986 | European Pat. Off. | H04N 5/44 |
| 1-117585 | of 0000 | Japan . | |

OTHER PUBLICATIONS

Patent Abstracts of Japan, vol. 13, No. 359, Aug. 10, 1989 & JP 1–117585.

ERSOZ: "Synchronization of Asynchronous video signals–a survey", IEEE Int. Conf. on Consumer Electronics, Jun. 1992, pp. 266–267.

IEEE Transactions on Consumer Electronics, vol. 36, No. 3, Aug. 1990, Johnson et al., "Low Cost Picture–in–Picture for Color TV Receivers", pp. 380–386.

*Primary Examiner*—Andrew I. Faile
*Assistant Examiner*—Sam Huang
*Attorney, Agent, or Firm*—Joseph S. Tripoli; Robert D. Shedd

[57] ABSTRACT

Apparatus for combining an auxiliary image and a main image includes a source of a main image video signal and a source of samples representing an auxiliary image video signal having successive fields. A quincunx subsampler is coupled to the auxiliary image sample source and subsamples the auxiliary image samples in either a first sample pattern in which samples are taken at a first set of horizontal locations, or a second sample pattern in which samples are taken at a second set of horizontal locations substantially midway between the first set, all in response to a control signal. A signal combiner is coupled to the quincunx subsampler and the main image signal source, and combines the main image signal and a signal representing the quincunx subsampled auxiliary image samples to generate a signal representing a combined image of the main and auxiliary images. A control circuit, generates the quincunx subsampler control signal so that the quincunx subsampler takes samples in one of the sample patterns at the beginning of each auxiliary image video signal field, and in the other sample pattern after a switch time calculated so that the quincunx subsampled auxiliary image samples in the combined image all are taken by the same sample pattern.

8 Claims, 6 Drawing Sheets

APPARATUS FOR SAMPLING AND DISPLAYING AN AUXILIARY IMAGE WITH A MAIN IMAGE TO ELIMINATE A SPATIAL SEAM IN THE AUXILIARY IMAGE

FIELD OF THE INVENTION

This application claims benefit of Provisional Appl. 60/025,532 filed Sep. 6, 1996.

The present invention relates to a picture-in-picture system using quincunx sampling to improve horizontal resolution.

BACKGROUND OF THE INVENTION

Present image display systems include the ability to display a small auxiliary image in addition to a larger main image. This smaller image may be displayed within the boundaries of the larger main picture, in which case, such a system is termed a picture-in-picture (PIP) system, or the smaller image may be located outside (e.g. to the left or right side of the main image, in which case the system is termed a picture-outside-picture (POP) system. The main and auxiliary images may be derived from the same image source, such as a freeze frame PIP image of the main image, or may be derived from an independent source, such as a system in which one tuner tunes one video signal which is displayed as the main image, and a second tuner tunes a second video signal, independent of the first tuner, which is displayed as the inset image.

A PIP or POP system operates by storing compressed image data representing the auxiliary image as it occurs in the auxiliary video signal, and then substituting this compressed image data for the main image signal at the portion of the main image which is designated to display the auxiliary image. The system must supply an amount of memory sufficient to store the auxiliary image data from the time it occurs in its video signal to the time it is displayed in the main image. Known systems provide sufficient memory to hold either a frame or a field of auxiliary video data. Because memory is relatively expensive, it is desirable to minimize the amount of memory required. To decrease the amount of memory required, known PIP and POP systems subsample the auxiliary video signal, and store only a single field of subsampled auxiliary video data. A display method, complementary to the subsampling method, is used to display the PIP or POP image.

Known subsampling techniques, however, consist of straightforward 'take one sample, discard N samples' repeated for each line in the auxiliary video signal. This undesirably decreases the horizontal resolution of the PIP or POP image, which, in turn, decreases the perceived quality of the displayed PIP or POP image. A subsampling method which can increase the horizontal resolution of a PIP or POP image, without increasing the amount of memory necessary to store the PIP or POP image data for later display with the main image is desirable.

Quincunx subsampling is one method to increase the perceived horizontal resolution of the subsampled auxiliary image without increasing the amount of memory required to temporarily store the subsampled auxiliary image data. A quincuncial pattern is defined, in terms of spatial sampling, as four samples arranged in a square and one sample in the middle of the square. Quincunx sampling involves subsampling one line of the auxiliary image at a first set of equally spaced horizontal locations, and subsampling the next adjacent horizontal line (i.e. in the next field) at a second set of horizontal locations halfway between the first set, and repeating this pattern. The top portion of FIG. 3, described in more detail below, illustrates this sampling technique where the "X"s represent subsampled samples, and the "+"s represent skipped samples. As can be seen, and as will be described below, the same number of samples are taken in each horizontal line, but the samples, taken all together, cover twice as many horizontal locations, thus increasing the perceived horizontal resolution of the subsampled auxiliary image.

Because spatially adjacent lines occur in temporally adjacent fields, quincunx sampling may be accomplished by sampling all the lines in one field of the auxiliary image at one set of horizontal locations, and sampling all the lines in the next adjacent field at a second set of horizontal locations halfway between the horizontal locations of the preceding field. This pattern is repeated. Thus, each line within a field is sampled identically to all the other lines in that same field, but the horizontal locations of subsampled samples in the lines in one field are halfway between the horizontal locations of the subsampled samples in lines in the adjacent fields.

SUMMARY OF THE INVENTION

A problem occurs in PIP or POP systems using quincunx sampling. Because the main and auxiliary video signals are not synchronized, when a field of subsampled auxiliary image samples is to be retrieved from the memory and displayed in the main image, one portion of the memory temporarily contains samples taken from a preceding auxiliary image field, while the other portion of the memory contains samples taken from the current auxiliary image field. Because these fields are 1/60 second apart (in the United States NTSC standard) a seam, termed a temporal seam, occurs at the juxtaposition of the image portions formed from the retrieved samples from these two portions of the memory. If, additionally, samples from the preceding field were taken using one sampling pattern, while samples in the current field are taken with the other sampling pattern, then, when these samples are combined with the main image and displayed, there is a seam, termed a spatial seam, at the temporal seam location between the samples taken from the preceding auxiliary field, and those taken from the current auxiliary field. This seriously degrades the quality of the inset auxiliary image. It is desirable to provide for the perceived increased horizontal resolution provided by quincunx sampling without the degradation resulting from the spatial seam at the temporal seam location.

In accordance with principles of the present invention, apparatus for combining an auxiliary image and a main image includes a source of a main image video signal and a source of samples representing an auxiliary image video signal having successive fields. A quincunx subsampler is coupled to the auxiliary image sample source and subsamples the auxiliary image samples in either a first sample pattern in which samples are taken at a first set of horizontal locations, or a second sample pattern in which samples are taken at a second set of horizontal locations substantially midway between the first set, all in response to a control signal. A signal combiner is coupled to the quincunx subsampler and the main image signal source, and combines the main image signal and a signal representing the quincunx subsampled auxiliary image samples to generate a signal representing a combined image of the main and auxiliary images. A control circuit, generates the quincunx subsampler control signal so that the quincunx subsampler takes samples in one of the sample patterns at the beginning of each auxiliary image video signal field, and in the other sample pattern after a switch time calculated so that the quincunx subsampled auxiliary image samples in the combined image all are taken by the same sample pattern.

Figure 1:
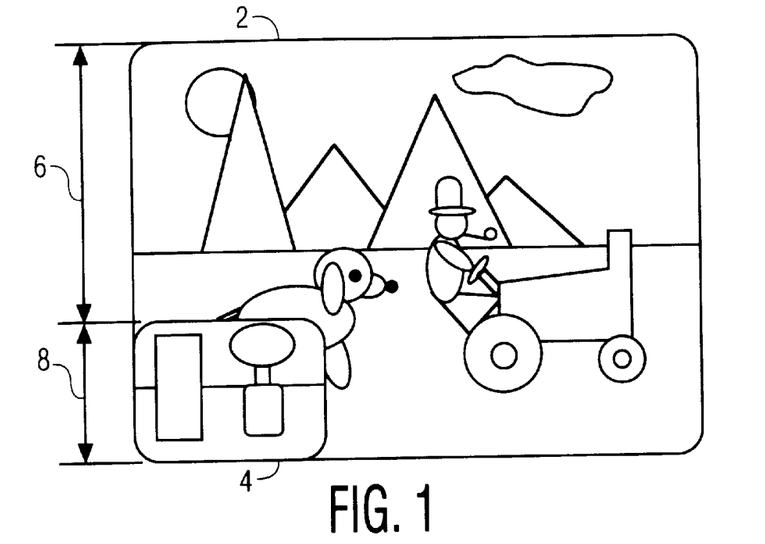
FIG. 1 illustrates a display image illustrating a main and a picture-in-picture (PIP) image and incorporating the present invention.

The illustrated embodiment is described in terms of a picture-in-picture (PIP) system, producing an image as illustrated in FIG. 1. However the principles of the present invention are equally applicable to other multiple picture systems, such as a picture-outside-picture (POP) in which a small image is placed outside of (i.e. to the left or the right) of a main image.

DETAILED DESCRIPTION

FIG. 1 illustrates a PIP display image including a main and an auxiliary image and incorporating the present invention. In FIG. 1, a main image 2 is shown as it might be displayed on a display device, such as a television receiver or monitor. The main image 2 may be generated by known signal processing circuitry, including a tuner responsive to a television signal received from antenna or a cable. Also shown in FIG. 1 is a second image 4 which is inset in the bottom left hand corner of the main image 2. The auxiliary image 2 in the illustrated embodiment is termed a picture-in-picture (PIP) image. The PIP image is also generated by known signal processing circuitry, possibly including a second tuner responsive to a second television signal received from an antenna or a cable. Alternatively, the second tuner may be embodied in a separate video cassette recorder (VCR). A signal representing the PIP image 4 is combined with the signal representing the main image 2 in a known manner, and the combined signal supplied to a display device, which displays the image illustrated in FIG. 1.

Figure 2:
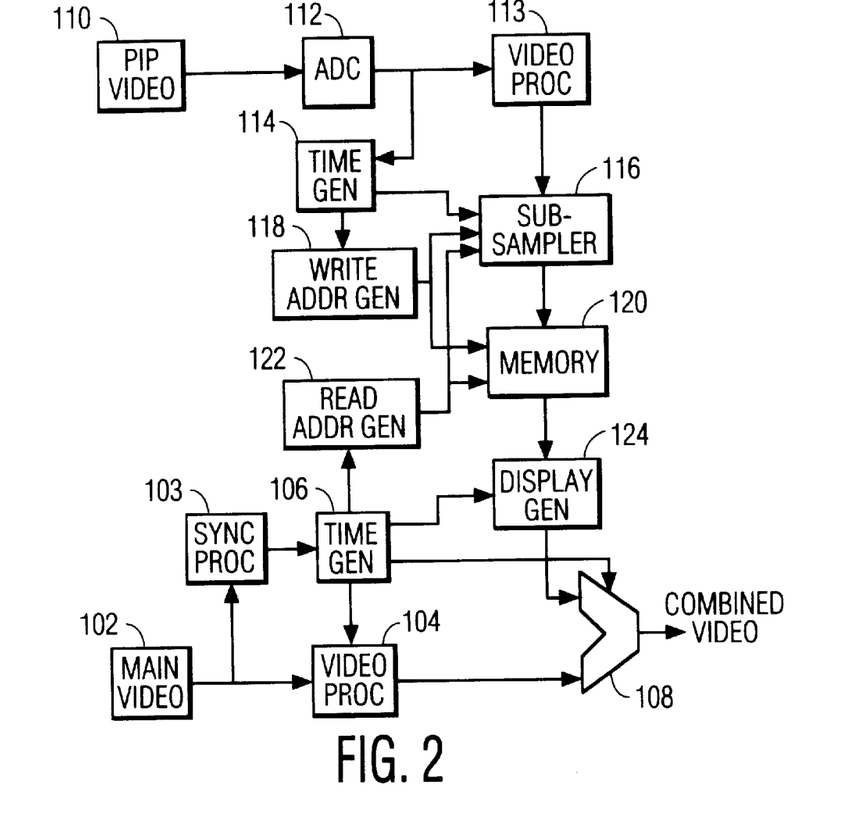
FIG. 2 is a diagram, partially in block form, partially in logic form, of a portion of a PIP system incorporating the present invention.

FIG. 2 is a diagram, partially in block form, partially in logic form, of a portion of a PIP system incorporating the present invention. In FIG. 2, a source 102 of a main video image representative signal includes an output terminal coupled to respective input terminals of a synchronization component processor 103 and a video component processor 104. An output terminal of the synchronization component processor 103 is coupled to a main timing signal generator 106. An output terminal of the video component processor 104 is coupled to a first data input terminal of multiplexer 108. An output terminal of the multiplexer 108 produced the combined video signal, and is coupled to a display device (not shown) in a known manner. Respective output terminals of the main timing signal generator 106 are coupled to a clock input terminal of the video component processor 104 and to a control input terminal of the multiplexer 108.

A source 110 of a PIP video image signal is coupled to an input terminal of a PIP ADC 112. An output terminal of the PIP ADC 112 is coupled to respective input terminals of a PIP video processor 113 and a PIP timing generator 114. An output terminal of the PIP video processor 113 is coupled to a data input terminal of a quincunx subsample 116. An output terminal of the subsampler 116 is coupled to a data input terminal of a field memory 120. A data output terminal of the field memory 120 is coupled to a data input terminal of an inset image display signal generator 124. An output terminal of the display generator 124 is coupled to a second data input terminal of the multiplexer 108.

Respective output terminals of the PIP timing signal generator 114 are coupled to a corresponding input terminals of the subsampler 116 and a write address generator 118. The write address generator 118 has an output terminal coupled to respective write address input terminals of the subsampler 116 and the field memory 120. Respective output terminals of the main timing signal generator 106 are coupled to corresponding input terminals of a read address generator 122 and the display generator 124. The read address generator 122 has an output terminal coupled to respective read address input terminals of the subsampler 116 and the field memory 120.

Referring to both FIG. 1 and FIG. 2, the main video signal from the main video signal source 102 includes a video component and a synchronization component. The synchronization component processor 103 extracts and processes the synchronization component signal. The synchronization signal is supplied to timing generator 106 which generates a timing signal in synchronism with the clock signal at $4 \cdot f_{sc}$ (the color subcarrier frequency). This timing signal is coupled to the main video processor 104. The video processor 104 processes the main video signal in a known manner. For example, in a preferred embodiment, the main video processor 104 contains a luminance/chrominance signal separator, such as a comb filter, producing separate luminance and chrominance signals. The main video processor 104 may also include a demodulator for the chrominance signal and produce separate I and Q or U and V signals, and may further include a color signal matrix, and generate R, G and B color component signals. Also in the preferred embodiment, the main video processor 104 includes an analog-to-digital converter, and may perform part of its processing, including comb filtering, in digital circuitry. Alternatively, it is also possible to perform no video processing at all. In this case the main video signal is passed, unchanged, from the main video signal source 102 to the multiplexer 108.

The main timing signal generator 106 also produces a signal indicating when the display device is scanning the portion of the display image in which the PIP inset image is to be located. This signal is supplied to the control input terminal of the multiplexer 108. When the main image is to be displayed, the multiplexer 108 is conditioned to couple the main video processor 103 to its output terminal, and when the PIP image is to be displayed, the multiplexer 108 is conditioned to couple the display generator 124 to its output terminal.

Simultaneously, the PIP video signal is processed by the PIP ADC 112 to produce samples representing the PIP video signal at a frequency of 4·$f_{sc}$. These samples are processed by the PIP timing signal generator 114 and the PIP video signal processor 113. Specifically, the PIP timing signal generator 114 identifies, extracts and processes the PIP synchronization component. The PIP video processor 113 comprises digital circuitry processing the PIP video signal samples from the PIP ADC 112. Similarly to the main video processor 104 described above, in a preferred embodiment, the video processing includes circuitry, such as a comb filter, to separate the luminance and chrominance components from the PIP video signal. The PIP video processor 113 may further include a demodulator to separate the I and Q or U and V chrominance components. Alternatively, the PIP video processor 113 may perform no further processing of the PIP video signal samples, in which case the output of the PIP ADC 112 is coupled directly to the input terminal of the quincunx subsampler 116.

This PIP image sample sequence from the PIP video processor 113 is subsampled by the quincunx subsampler 116, in response to a timing signal from the PIP timing signal generator 114, and the field memory read and write addresses, in a manner to be described in more detail below. In general, each field of the PIP sample sequence is independently subsampled in the following manner. In the vertical direction, three vertically aligned horizontal PIP samples are filtered to generate a single PIP subsampled sample. In a preferred embodiment, the three vertically aligned samples are averaged. In the horizontal direction the filtered sequence is subsampled at a 6:1 ratio, i.e. keep one sample, discard five samples in a manner to be described in more detail below. The timing of the horizontal subsampling is controlled in a manner described in more detail below to provide quincunx sampling. It is possible to quincunx subsample only a component of the PIP image sample stream. For example, in the preferred embodiment, the luminance component sample stream is quincunx subsampled.

One field or the subsampled PIP samples from the subsampler 116 are stored in the field memory 120. Under the control of the main timing signal generator 106, the display generator 124 extracts the previously stored subsampled samples from the field memory 120, when the PIP image 4 is being displayed. The display generator 124 performs an inverse function to the subsampling performed in the quincunx subsampler 116 to generate a sample sequence representing the inset auxiliary image. In addition, the display generator 124 includes a digital-to-analog converter if the main video signal 104 is maintained in the analog domain. The output signal from the display generator 124, thus, corresponds to the output signal from the main video processor 104. That is, if the output signal from the main video processor 104 is respective analog luminance and chrominance signals (as in the preferred embodiment), then the output signal from the display generator 124 is also respective analog luminance and chrominance signals.

During the time when the PIP inset image 4 is to be displayed, the multiplexer 108 is conditioned to pass the decoded samples from the decoder 124 to its output terminal. When the main image 2 is being displayed, the main video samples from the main ADC 104 are passed through the multiplexer 108. In the preferred embodiment, where the main and PIP image signals comprise respective analog luminance and chrominance signals, the multiplexer 108 comprises two analog signal switches, one switching between the analog luminance components of the main video and PIP video signals, and the other switching between the analog chrominance components of the main video and PIP video signals. If the main chrominance signal is demodulated into I and Q or U and V signals, or further dematrixed into R, G and B color component signals, then three multiplexers, one for each component, are provided.

As described above, when horizontal subsampling is performed, the horizontal resolution of the image represented by the subsamples has low horizontal resolution. Using quincunx sampling, described below, is a method of overcoming the low horizontal resolution of the subsampled PIP image.

Figure 3:
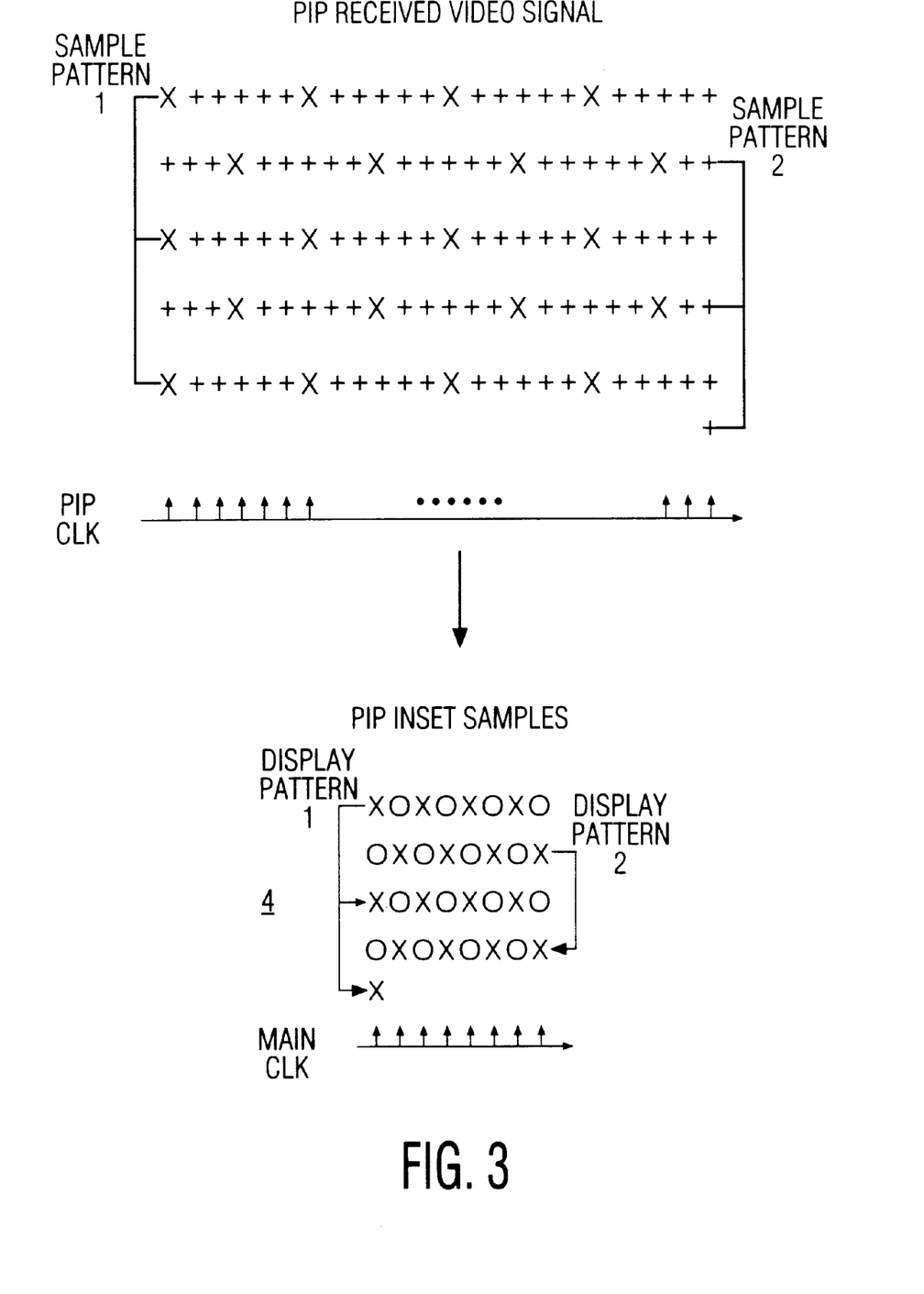
FIG. 3 is a more detailed illustration of the PIP display image illustrating quincunx sampling.

FIG. 3 is a more detailed illustration of the received PIP display image 4 illustrating quincunx sampling. As described above, in the preferred embodiment, the luminance and chrominance components of the PIP video signal are separated into respective sample streams. The top portion of FIG. 3 illustrates the sampling pattern of a portion of a frame of the PIP image sample sequence. Each line in FIG. 3 represents the results of vertically filtering (e.g. averaging) three vertically adjacent lines in each field. Each line of vertically filtered samples (referred to simple as lines, below) is represented by a horizontal line of "X"s or "+"s (referred to simply as samples, below). Each such sample is produced at a cycle of the PIP 4·$f_{sc}$ timing signal (PIP CLK), illustrated below the illustrated portion of the received PIP display image, and consists of one portion representing the luminance component of that sample, and one portion representing the chrominance component of that sample. Each "X" represents a sample taken in the horizontal subsampling process, and each "+" represents a sample skipped. Because the PIP video image is interlaced, adjacent vertically filtered horizontal lines are transmitted in successive fields.

In the topmost line of FIG. 3, samples are taken, "X", every sixth sample, with the leftmost sample being the first sample taken. Five samples are then skipped, "+", before the next sample is taken "X". This pattern repeats through the remainder of the line. Samples in the third and fifth illustrated vertically filtered lines are taken at the same set of horizontal locations as the first line. Because of the interacting, these lines are all from the same field. Thus, each line in a field is sampled in an identical pattern. This pattern is designated sample pattern SP1.

In the second line of FIG. 3, in the next field, the fourth sample, "X", is the first sample taken. Then, five samples are skipped, "+", before the next sample is taken. This pattern repeats through the remainder of the time. Samples in the fourth line are taken at the same set of horizontal locations as the second line. The samples in this field are taken from horizontal locations midway between the horizontal locations of samples of the adjacent lines from the preceding field. This pattern, designated sample pattern SP2, may be produced by delaying the subsampling timing signals which generate sample pattern SP1 by three 4·$f_{sc}$ PIP clock cycles.

The use of sample patterns SP1 and SP2 results in a pattern of sampling termed quincunx sampling, and increases the perceived horizontal resolution of the PIP image by providing samples from more horizontal locations in the PIP image. The samples taken illustrated as "X"s in the top portion of FIG. 3 are stored in the memory 120 (of FIG. 2).

The bottom portion of FIG. 3 illustrates the method for displaying the PIP inset samples previously stored in the memory 120 (of FIG. 2) as described above. The bottom portion of FIG. 3 illustrates a portion of the PIP image 4 as it is displayed in the combined image illustrated in FIG. 1. Each sample illustrated in the bottom portion of FIG. 3 is produced at a main 4·$f_{sc}$ timing signal time (MAIN CLK). In general, each sample is displayed, as represented by an "X", and then immediately repeated, as represented by an "O" immediately to the right of its corresponding "X".

The leftmost sample of the topmost line of the illustrated portion of the PIP image 4, "X", is displayed. This sample is then repeated at the next $4 \cdot f_{sc}$ main clock time, "O". Then the next previously stored sample is displayed, "X", and immediately repeated, "O". This is repeated for the remainder of this PIP image line. This pattern is repeated for the third and fifth (and all odd numbered) lines of the PIP image. These lines are in the same field as that of the first line. Thus, as for the PIP video signal sampling process described above, each line in a field is displayed in the same pattern. This pattern is designated display pattern DP1, and corresponds to sample pattern SP1, described above.

The leftmost sample of the second line is an "O", which is a repeat of a preceding sample (not shown) immediately to its left. The second sample of the second line, "X", is displayed, and then immediately repeated at the next $4 \cdot f_{sc}$ main clock time, "O". Then the next previously stored sample is displayed, "X" and repeated "O". This is repeated for the remainder of this PIP inset image line. The same pattern is repeated for the fourth (and all even numbered) lines of the PIP image. This pattern is designated display pattern DP2, and corresponds to sample pattern SP2, described above. The display pattern DP2 may be produced by delaying the samples produced as display pattern DP1 by one $4 \cdot f_{sc}$ main clock cycle.

Each sample consists of a portion representing the luminance component of that sample and a portion representing the chrominance component of that sample. In the preferred embodiment, theses sample portions are converted independently to analog form and respective luminance and chrominance analog signals generated, corresponding to the analog luminance and chrominance signals generated by the main video processor 104. As can be seen, the "X"s, representing the first display of previously stored PIP image samples, are arranged in a quincunx display pattern, the same as the sampling pattern illustrated in the top portion of FIG. 3. In this manner, the perceived horizontal resolution of the PIP image is increased without increasing the memory size required of the field memory 120 (of FIG. 2).

Figure 4:
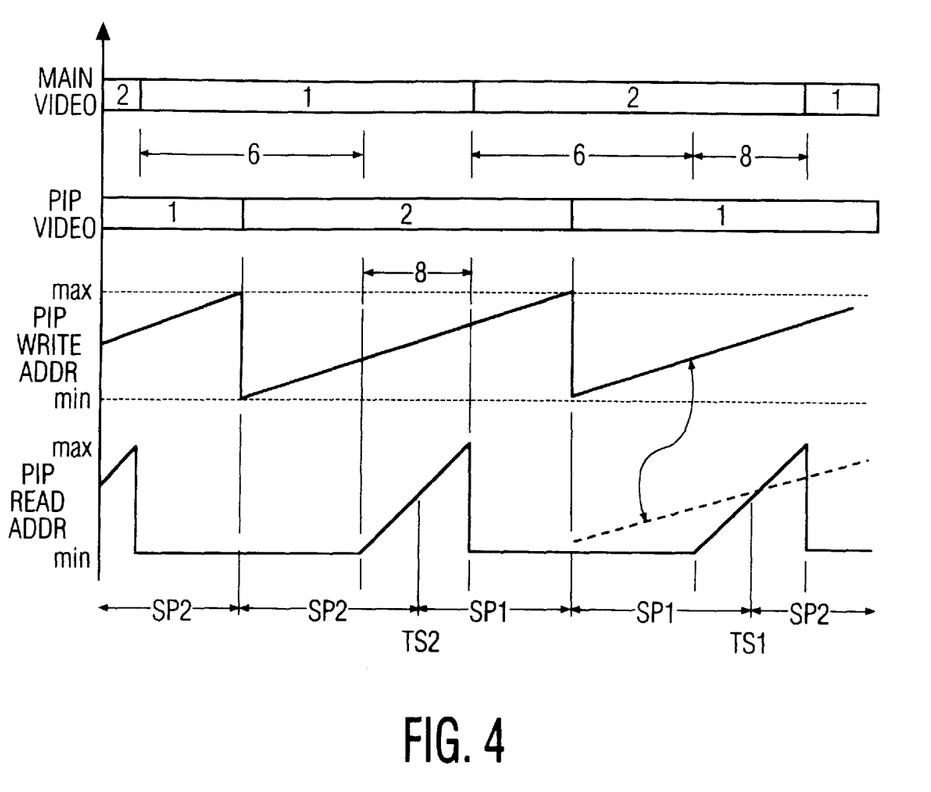
FIG. 4 is a waveform diagram of the main and PIP video signals, and of PIP memory access addresses.

A problem can arise using quincunx sampling for a PIP image signal, however. This problem may be better understood by reference to FIGS. 4 and 5. FIG. 4 is a waveform diagram of the main and PIP video signals, and of PIP memory access addresses. In FIG. 4, the signal from the main video signal source 102 (of FIG. 2) is illustrated in the top waveform as consisting of successive frames. As in standard interlaced video signals, in each frame there are two fields whose lines are interlaced in a known manner, and usually designated even and odd fields. Each field of the main video signal is represented by a rectangle. This is represented in FIG. 4 by numbering the rectangles representing the fields of the main video signal 1 and 2. Two complete fields of the main video signal, 1 and 2, respectively, are illustrated in FIG. 4. The left hand edge of each rectangle represents the time location of the vertical synchronization pulse associated with that field. There is no intended correspondence between even and odd fields of a video frame in the field designations 1 and 2 in FIG. 4.

The signal from the PIP video signal source 110 is illustrated in the second waveform. This video signal also includes successive frames, each frame containing two fields of interlaced lines, each represented by rectangles numbered 1 and 2. The left hand edge of each rectangle represents the time location of the vertical synchronization pulse associated with that field. The PIP video signal is not temporally aligned with the main video signal, as indicated by the differing time locations of the vertical synchronization pulses between the main and PIP video signals.

Referring to FIG. 2, as samples of the PIP video signal, containing a luminance and a chrominance portion in the preferred embodiment, are generated by the PIP video processor 113, they are first vertically filtered, and then the vertically filtered samples are horizontally subsampled, in a manner to be described in more detail below, at times controlled by the subsampler 116, and those subsampled samples are stored in the memory 120 in locations controlled by the write address generator 118. In response to the PIP vertical synchronization pulse, the write address generator resets the write address to the beginning of the field memory 120 (or to the beginning of a buffer within the field memory 120) which is to hold the subsampled PIP inset samples. Such a buffer is usually filled from a low address to a high address, so this initial address is the minimum address.

The write address produced by the write address generator 118 is represented in FIG. 4 in the third waveform. At the beginning of field 2 in the PIP video signal (second waveform), the write address generator 118 is conditioned to produce a PIP write address which is the minimum address. As subsampled samples are produced by the subsampler 116 (of FIG. 2), they are stored in the field memory 120 at increasing addresses as supplied by the write address generator 118. This is indicated in FIG. 4 by a gradually increasing write address signal. By the end of field 2, subsampled samples have been written into all of the write buffer, and the address signal has reached its maximum value. The vertical synchronization pulse of the next field (field 1) then resets the write address generator 118 address to the beginning of the buffer (i.e. the minimum address) again, and the process repeats itself.

While subsampled PIP samples are being written into the memory 120 under control of the subsampler 116 and the write address generator 118, as described above, the scan location of the main video signal is being monitored by the display generator 124. During the first portion of the main image, 6 (of FIG. 1), no portion of the PIP image is being displayed. During the last portion of the main image, 8, (e.g. in the illustrated embodiment, the bottom third of the combined image) the subsampled samples previously stored in the memory 120 are retrieved by the display generator 124 from addresses controlled by the read address generator 122. These samples are processed by the display generator 124 in a manner to be described in more detail below, to produce the sample pattern illustrated at the bottom of FIG. 3. In the preferred embodiment, these samples are further processed to form respective analog luminance and chrominance signals. These signals are then substituted for the corresponding main video luminance and chrominance signals at the multiplexer 108, during the time when the PIP image is being displayed.

Similarly to the write address generator 118, the vertical synchronization pulse of the main video signal conditions the read address generator 122 to produce an address which points to the beginning of the field memory 120 (or the beginning of the buffer in the field memory 120) holding the PIP subsampled samples. During the bottom portion, 8, of the combined image where the PIP image 4 is inserted into the combined image, the read address generator 122 controls the field memory 120 to retrieve PIP samples from the field memory 120 in the same order as they were written into the field memory 120 by the subsampler 116. Thus, samples are retrieved starting at the minimum address and progressing to the maximum address as the PIP image samples are inserted into the combined image.

The read addresses generated by the read address generator 122 are represented by the fourth waveform. At the vertical synchronization pulse of the main video image, the read address generator 122 is conditioned to produce the address of the beginning of the field memory (or buffer within the field memory). The address doesn't change during the first portion, 6, of the combined video image. As the PIP samples are extracted from the field memory 120, the read address increases to the maximum address by the end of the main video field 2. The beginning of the next main video field 1 resets the read address generator 122 and the process repeats.

Figure 5:
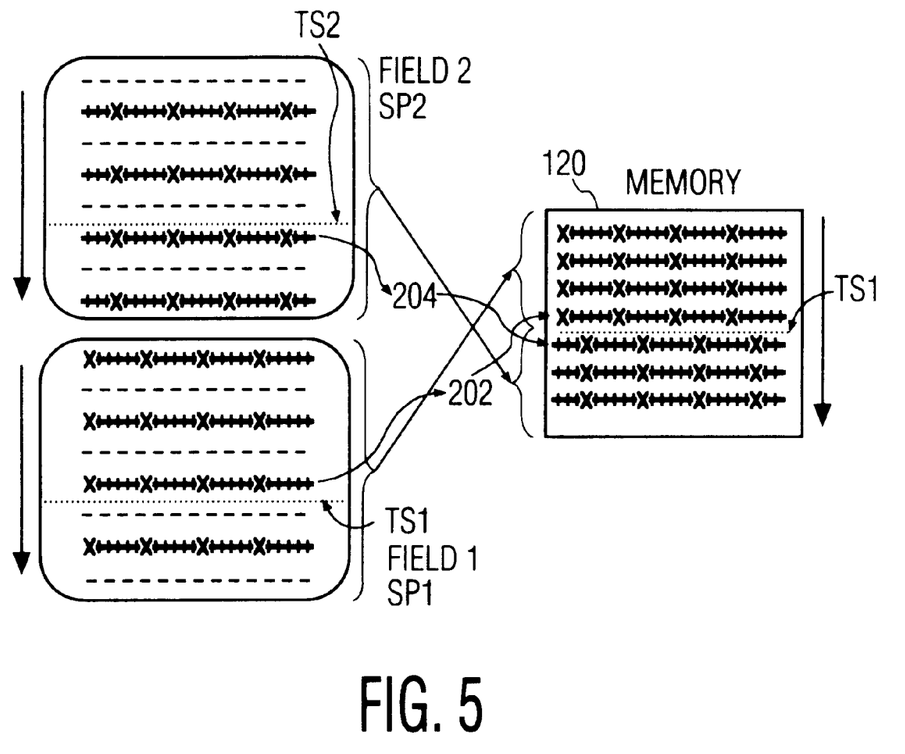
FIGS. 5 and 6 are more detailed illustrations of portions of a PIP display image illustrating a problem using quincunx sampling for a PIP image, and the solution.

FIG. 5 illustrates a problem which can occur with one implementation of quincunx sampling in a PIP system. In FIG. 5, a portion of the contents of the field memory 120 at a time TS1, which occurs within field 1 of the PIP image, as illustrated in FIG. 4. Referring to FIG. 5, a portion of the preceding field of the PIP image, field 2, is illustrated in the upper left hand portion of FIG. 5, with its sampling pattern SP2 illustrated (using the same indicia as in FIG. 3). Dashed lines represent lines from field 1. Field 2 is scanned from top to bottom, in normal manner, as indicated by the arrow to the left of field 2. A portion of the next successive field, field 1, is illustrated directly below field 2, with its sampling pattern SP1. Dashed lines represent lanes from field 2. Field 1 is also scanned from top to bottom as indicated by the arrow to the left of field 1. To the right of the fields 1 and 2 images, is the state of the portion of the memory 120 corresponding to the illustrated portions of field 1 and field 2, at the time TS1. The memory 120, as illustrated in FIG. 5, is written into from the top to the bottom, as indicated by the arrow to the right of the memory 120. One skilled in the art will understand that only the subsampled samples, "X", are stored in the memory, and not the intervening samples "+". The patterns illustrated in the memory block 120 of FIG. 5 are meant merely to indicate the sampling pattern in which the subsampled samples stored in the illustrated portion of the field memory 120 were taken.

At the end of PIP image field 2, the memory 120 is completely filled with subsampled samples, "X", taken from field 2 using sampling pattern SP2. At the start of field 1, the field 2 samples in memory 120 are overwritten with subsampled samples from field 1 using sampling pattern SP1, starting at the top of the memory toward the bottom, as illustrated in FIG. 5. At time TS1, the bottom portion of the memory 120 contains samples from field 2, as indicated by the arrow from field 2 to the bottom portion of the memory 120; while the top portion contains samples from field 1, as indicated by the arrow from frame 1 to the top portion of the memory 120.

Referring to FIG. 4, a portion of the PIP write address waveform for field 1 of the PIP video signal is superimposed in phantom atop the PIP read address waveform for field 2 of the main video signal. At time TS1, the PIP read address is the same as the PIP write address. Referring to FIG. 5, immediately before time TS1, line 202 from field 1 of the PIP image is subsampled from the PIP video signal and is written into the memory 120 at the address provided by the write address generator 118 (of FIG. 2). In addition, line 202, just written into the memory 120, is read from that same location in the memory 120 and displayed at the appropriate location in the PIP inset image 4 (of FIG. 1). Immediately after time TS1, the samples making up the next line 204 in the PIP image 4 (of FIG. 1) are to be read from the memory 120 at the address provided by the read address generator 122. However, this line has not yet been received and subsampled from the PIP video signal in field 1. Instead, the line 204 of the displayed PIP image 4 is generated from samples which were subsampled from the previous field 2.

Line 202 (and the preceding lines) of the displayed PIP image 4 was sampled from field 1 of the PIP image, while line 204 (and the remaining lines) was sampled from the preceding field 2, which, thus, occurs 1/60 second earlier than field 1 (in the United States NTSC standard). This juxtaposition in the PIP image produces what is termed a temporal seam, TS, and is a phenomenon known in PIP systems using field memories. In addition to the temporal seam, in the system illustrated in FIG. 5, the samples in the upper portion of the field memory 120 (e.g. from the current field 1) were taken using sampling pattern SP1, while the samples in the lower portion of the field memory 120 (e.g. from the preceding field 2) were taken using the sampling pattern SP2. The difference in the horizontal locations of the samples taken between sampling patterns, SP1 and SP2, of field 1 and field 2, respectively, (emphasized by the sampling patterns illustrated in the memory block 120 in FIG. 5) makes a visible discontinuity in the displayed PIP image 4 at the temporal seam location, termed a spatial seam in the remainder of this application. The change in sampling patterns at the temporal seam, thus, causes a perceptible degradation of the PIP image at the temporal seam.

Figure 6:
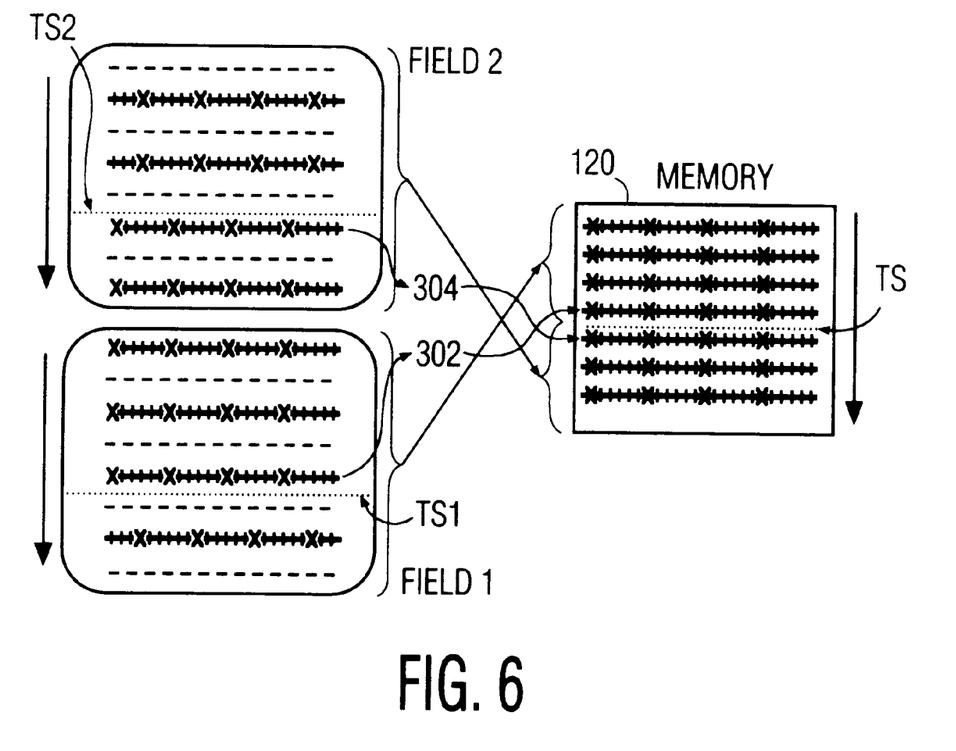

FIG. 6 corresponds to FIG. 5, and illustrates a solution to the problem of the spatial seam at the temporal seam TS1, and its perceptible degradation of the PIP image. The beginning of field 2 is sampled using sample pattern SP2 (as illustrated in FIG. 3), which continues until time TS2, as is illustrated at the bottom of FIG. 4. At time TS2, the subsampling pattern for field 2 is changed from sample pattern SP2 to sample pattern SP1, and the remainder of field 2 is sampled using sample pattern SP1. At the beginning of field 1, the sampling pattern remains SP1 until time TS1. At time TS1, the sample pattern is changed to sample pattern SP2 again. This is repeated for all successive fields.

The result of controlling the sampling patterns in this manner is shown in the memory 120 status at time TS1 in FIG. 6. At time TS1, the bottom portion of the memory 120 still contains that portion of the subsampled samples from the bottom portion of field 2 (e.g. below the line indicating time TS2 in field 2). These samples have been sampled using sample pattern SP1, as described above. The top portion of the memory 120 contains subsampled samples from the top portion of field 1 (e.g. above the line indicating time TS1 in field 1). These samples also have been sampled using sample pattern SP1. Thus, when these samples are retrieved from the memory 120 to generate the PIP image 4, the sample pattern will be consistent from top to bottom of the PIP image. There will be no perceptible spatial seam at the temporal seam location in the main video field 1. In a similar manner, although not illustrated, all the samples for the next field of the displayed PIP image 4 (of FIG. 1) will have been sampled using sample pattern SP2, again, producing no perceptible spatial seam at the temporal seam location for that field.

Figure 7:
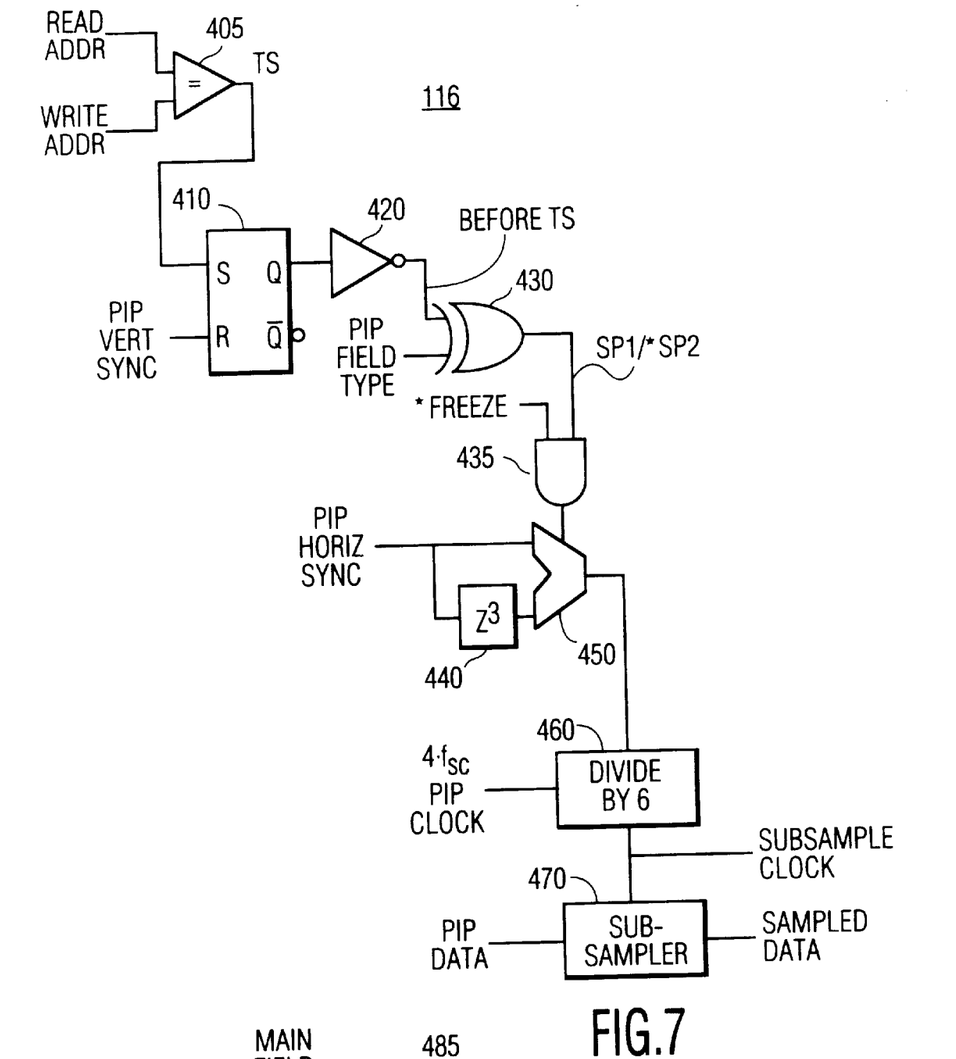
FIG. 7 is a diagram, partially in block form and partially in logic form, of an encoder for generating PIP data for storage in a field memory.

FIG. 7 is a diagram, partially in block form and partially in logic form, of a subsampler 116 for generating subsampled PIP samples for storage in the field memory 120 (of FIG. 2). In FIG. 7, the read address signal from the read address generator 122 is coupled to a first input terminal of a comparator 405, and the write address signal from the write address generator 118 is coupled to a second input terminal of the comparator 405. An output terminal of the comparator 405 is coupled to a set input terminal S of an S-R flip flop 410. A non-inverting output terminal Q of the S-R flip flop 410 is coupled to an input terminal of an inverter 420. An output terminal of the inverter 420 is coupled to a first input terminal of an exclusive-OR gate 430. An output terminal of the exclusive-OR gate 430 is coupled to a first input terminal of an AND gate 435. An output terminal of the AND gate 435 is coupled to a control input terminal of a multiplexer 450. The PIP vertical synchronization pulse signal from the PIP timing signal generator 114 is coupled to a reset input terminal R of the S-R flip flop 410. A signal indicating the current PIP video signal field type (described below) is coupled to a second input terminal of the exclusive-OR gate 430. A signal, FREEZE*, an active-low signal indicating that a freeze frame function is to be performed, is coupled to a second input terminal of the AND gate 435.

A PIP horizontal synchronization reset signal from the PIP timing signal generator 114 is coupled to a first data input terminal of the multiplexer 450 and to an input terminal of a three $4 \cdot f_{sc}$ PIP timing signal cycle delay circuit 440. In the preferred embodiment, the PIP horizontal synchronization reset signal is a pulse having a width of a single PIP $4 \cdot f_{sc}$ cycle occurring at the middle of the PIP horizontal synchronization component signal. Alternatively, such a pulse signal may occur at the beginning or end of the PIP horizontal synchronization signal, or anywhere within the horizontal synchronization signal.

An output terminal of the delay circuitry 440 is coupled to a second data input terminal of the multiplexer 450. An output terminal of the multiplexer 450 is coupled to a reset input terminal of a divide-by-6 circuit 460. A timing signal output terminal of the divide-by-6 circuit 460 produces a PIP subsample timing signal, and is coupled to a corresponding input terminal of a subsampler 470. The $4 \cdot f_{sc}$ PIP timing signal from the PIP timing signal generator 114 is coupled to a timing signal input terminal of the divide-by-6 circuit 460. The PIP video sample stream from the PIP video processor 113 is coupled to a data input terminal of the subsampler 470. An output terminal of the subsampler 470 produces subsampled data, and is coupled to the field memory 120.

Referring to FIG. 3, it may be seen that the sample pattern SP2 is identical to the sampling pattern SP1, but delayed by three $4 \cdot f_{sc}$ PIP timing signal cycles. In operation, the S-R flip flop 410 is reset at the beginning of each PIP field by the PIP vertical synchronization pulse. Thus, at the beginning of each field, the signal at the Q output terminal of the S-R flip flop 410 is a logic '0' signal. The comparator 405 monitors the PIP read address and the PIP write address. When they are the same (e.g. at time TS), the comparator generates a logic '1' signal, and generates a logic '0' signal otherwise. This logic '1' signal from the comparator 405 at time TS sets the S-R flip flop 410, generating a logic '1' signal at the Q output terminal. This signal is inverted by the inverter 420 to produce a signal which is a logic '1' within a field before time TS and a logic '0' after time TS.

The PIP field type signal is a bistate signal indicating the type of the PIP field currently being received. Referring to FIG. 4, a PIP field is either field type 1 or field type 2. As described above, there is no intended correspondence between even and odd fields and field types 1 and 2. In the illustrated embodiment, a logic '0' signal indicates field type 1 and a logic '1' signal indicates field type 2. The exclusive-OR gate 430 operates to generate a signal representing the proper sampling pattern (e.g. SP1 or SP2) which is to be used to subsample the PIP video signal. In the illustrated embodiment, when the output of the exclusive-OR gate 430 is a logic '1' signal, sampling pattern SP1 is used, and when it is a logic '0' signal, sampling pattern SP2 is used.

Referring again to the description of FIGS. 5 and 6, above, for field type 1, sample pattern SP1 is used before time TS1 and sample pattern SP2 is used after time TS1. For field type 2 sample pattern SP2 is used before time TS2 and sample pattern SP1 is used after time TS2. When the PIP field type signal is a logic '0' signal, indicating field 1, and the BEFORE TS signal is a logic '1', e.g. before TS1, then the output of the exclusive-OR gate 430 is a logic '1' signal, which indicates sample pattern SP1. When the BEFORE TS signal changes to a logic '0' signal at time TS1, the output of the exclusive-OR gate 430 changes to a logic '0' signal, indicating sample pattern SP2. When the PIP field type signal is a logic '1' signal, indicating field 2, and the BEFORE TS signal is a logic '1', e.g. before TS2, then the output of the exclusive-OR gate 430 is a logic '0' signal, which indicates sample pattern SP2. When the BEFORE TS signal changes to a logic '0' signal at time TS2, the output of the exclusive-OR gate 430 changes to a logic '1' signal, indicating sample pattern SP1.

The sample pattern selection signal from the exclusive-OR gate 430, SP1/*SP2, is gated through the AND gate 435 by the *FREEZE signal. The *FREEZE signal, as described above, is used to indicate that a PIP freeze frame is to be performed. In a freeze frame operation, the writing of PIP data to the field memory 120 (of FIG. 2) is suspended, while read operation continues unchanged. Because no new samples are being written into the field memory 120 in this condition, the same samples are repeatedly read from the field memory and used to generate the inset PIP image. This has the effect of producing a fixed, or frozen, PIP inset image 4 on the display device. If, however, write operations are suspended at the end of a PIP field being quincunx sampled, as described above, then the portion of the field memory 120 written to before time TS will contain samples which were sampled with a one sample pattern while the portion of the field memory 120 written to after time TS will contain samples which were sampled with the other sample pattern.

During times when the full motion PIP image is being displayed, controlling the sampling patterns as just described, avoids a spatial seam at the temporal seam location, as described above. However, during times when the PIP image is frozen, this same overall sampling pattern will introduce a spatial seam into the PIP image at the temporal seam location. In order to prevent the display of a spatial seam at the temporal seam location in a frozen PIP image, the quincunx sampling is suspended for at least two fields before the writing of PIP video subsampled samples to the field memory 120 is suspended. The PIP inset image is subsampled in a rectangular pattern instead. While this decreases the perceived horizontal resolution, it eliminates the spatial seam at the temporal seam location which would result from freezing a quincunx sampled signal.

When the *FREEZE signal is a logic '1' signal, indicating that no freeze is imminent, the SP1/*SP2 signal is passed through the AND gate 435 to the control input terminal of the multiplexer 450. When the *FREEZE signal is a logic '0' signal, indicating that a freeze is imminent, then the SP1/*SP2 signal is blocked, and the output of the AND gate 435 is a logic '0' signal, indicating that sample pattern SP2 is to be used throughout the subsequent fields. This suspends the quincunx sampling pattern resulting from the simultaneous use of both sample pattern SP1 and SP2. Instead, the auxiliary image is subsampled in a rectangular pattern at the set of horizontal locations defined by sample pattern SP2. This continues for two fields, under the control of other, known, circuitry (not shown). Then this other circuitry suspends write operations to the field memory 120. When the freeze is canceled, the *FREEZE signal is conditioned to become a logic '1' signal, and quincunx sampling is enabled once more.

When the signal from the AND gate 435 is a logic '1' signal, indicating that sample pattern SP1 is to be used, the multiplexer 450 is conditioned to couple the PIP horizontal synchronization reset pulse signal directly from the PIP timing signal generator 114 to the reset input terminal of the divide-by-6 circuit 460. When the signal from the AND gate 435 is a logic '0' signal, indicating that sample pattern SP2 is to be used, the multiplexer 450 is conditioned to couple the delayed PIP horizontal synchronization reset pulse signal from three $4 \cdot f_{sc}$ PIP timing signal cycle delay circuit 440 to the reset input terminal of the divide-by-6 circuit 460.

The divide-by-6 counter produces a subsampling pulse every sixth PIP $4 \cdot f_{sc}$ timing signal cycle, starting from when a reset pulse is received from the multiplexer 450. When the undelayed PIP horizontal synchronization reset pulse is received at the reset input terminal of the divide-by-6 circuit 460 from the multiplexer 450, samples are taken at times which result in sample pattern SP1 (of FIGS. 3). When the PIP horizontal synchronization reset pulse delayed by three PIP $4 \cdot f_{sc}$ clock cycles is received at the input terminal of the divide-by-6 circuit 460 from the multiplexer 450, samples are taken at times which reset in sample pattern SP2. The subsampler 470 subsamples the PIP video sample stream from the PIP video processor 113 in response to the sampling signal from the divide-by-6 circuit 460. These subsampled samples are supplied to the field memory 120 (of FIG. 2).

Figure 8:
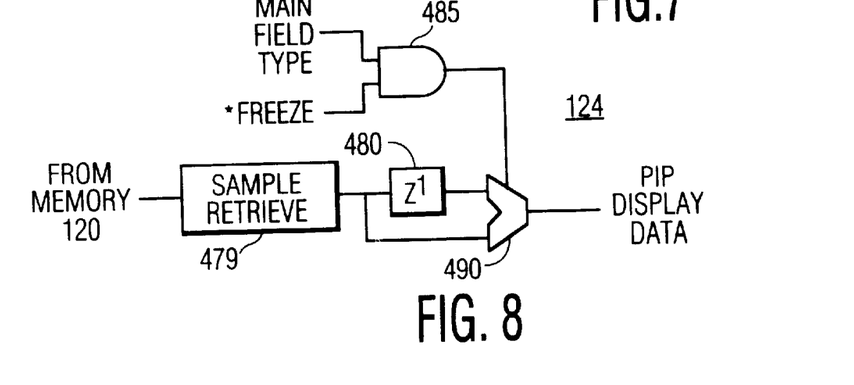
FIG. 8 is a diagram, partially in block form and partially in logic form, of a decoder for generating PIP data for insertion into a main image.

FIG. 8 is a diagram, partially in block form and partially in logic form, of a PIP inset image display generator 124 for generating PIP data for insertion into a main image. In FIG. 8, PIP subsampled samples from the field memory 120 (of FIG. 2), is coupled to an input terminal of a sample retrieval circuit 479. An output terminal of the sample retrieval circuit 479 is coupled to an input terminal of a one main $4 \cdot f_{sc}$ timing signal cycle delay circuit 480 and to a first data input terminal of a multiplexer 490. An output terminal of the delay circuit 480 is coupled to a second data input terminal of the multiplexer 490. An output terminal of the multiplexer 490 is coupled to the multiplexer 108 (of FIG. 2). A main field type signal is coupled to a first input terminal of an AND gate 485, and the *FREEZE signal (of FIG. 7) is coupled to a second input terminal of the AND gate 485. An output terminal of the AND gate 485 is coupled to a control input terminal of the multiplexer 490.

In operation, samples are retrieved from the field memory 120 from locations specified by the read address signal from the read address generator 122 by the sample retrieval circuit 479. As described above, in a preferred embodiment, these samples each have one portion representing the luminance component of that sample, and a second portion representing the chrominance component of that sample. The sample retrieval circuit 479, retrieves a sample at a $4 \cdot f_{sc}$ PIP timing signal cycle and provides that sample at its output terminal. The sample retrieval circuit 479 then holds that sample at its output terminal to be repeated at the next $4 \cdot f_{sc}$ PIP timing signal cycle. Then the next sample is retrieved from the field memory 120. This is repeated for all the samples in each line in the field memory 120.

Referring to FIG. 3, in operation, the main field type signal provides an indication of the display pattern (DP1 or DP2) corresponding to the sample pattern (SP1 or SP2, respectively) used to subsample the PIP video data currently being retrieved from the field memory 120 in a similar manner to the PIP field type signal described above with reference to FIG. 7. That is, when sample pattern SP1 had been used to sample the data currently being retrieved from the field memory 120, display pattern DP1 is used to display that data, and when sample pattern SP2 had been used to sample the data, then display pattern DP2 is used to display it. The *FREEZE signal, described above with reference to FIG. 7 is an active-low signal which is asserted when a freeze function is imminent. In response to this signal, quincunx sampling is disabled. This signal is used to gate the main field type signal to the control input terminal of the multiplexer 490.

In the illustrated embodiment, when the main field type signal is a logic '1', then display pattern DP1 is used to display the subsampled PIP samples, and when it is a logic '0' signal, then display pattern DP2 is used to display the subsampled PIP samples. When enabled by the *FREEZE signal, the main field type signal controls the multiplexer 490. When the main field type signal is a logic '1' signal, indicating display pattern DP1, then the multiplexer 490 is conditioned to couple the PIP sampled data directly from the sample retrieval circuit 479 to the multiplexer 108. This provides PIP subsampled samples undelayed, and produces the display pattern DP1, illustrated in FIG. 3. When the main field type signal is a logic '0' signal, indicating display pattern DP2, then the multiplexer 490 is conditioned to couple the delayed PIP sampled data from the one main $4 \cdot f_{sc}$ timing signal cycle delay circuitry 480 to the multiplexer 108. The delay introduced by the delay circuit 480 produces the display pattern DP2, illustrated in FIG. 3. When the *FREEZE signal indicates that a freeze frame function is being performed, then the output of the AND gate 485 is a logic '0', indicating display pattern DP2, which corresponds to the sampling pattern SP2 selected by the *FREEZE signal in FIG. 7.

The PIP sampling system described above, and illustrated in the drawing provides a PIP image with improved horizontal resolution without requiring additional samples, or a larger field memory. In addition, this system eliminates the perceptible spatial seam at the temporal seam location which can occur in such a system. Finally, this system provides a method for providing a freeze frame function without introducing a spatial seam at the temporal seam location into the frozen PIP image.

What is claimed is:

1. Apparatus for combining an auxiliary image and a main image, comprising:

a source of a main image signal;

a source of samples representing an auxiliary image signal having successive fields;

a quincunx subsampler, coupled to the auxiliary image sample source, for selectively subsampling the auxiliary image samples in one of a first sample pattern taking samples at a first set of horizontal locations and a second sample pattern taking samples at a second set of horizontal locations substantially midway between the first set of horizontal locations in response to a control signal;

a signal combiner, coupled to the quincunx subsampler and the main image signal source, for combining the main image signal and a signal representing the quincunx subsampled auxiliary image samples to generate a combined image signal; and a control circuit, for generating the quincunx subsampler control signal conditioning the quincunx subsampler to take samples in one of the first and second sample patterns at the beginning of each auxiliary image signal field, and in the other one of the first and second sample patterns after a switch time calculated so that the quincunx subsampled auxiliary image samples represented in the combined image signal all are taken by the same sample pattern.

2. The apparatus of claim 1, wherein:

the auxiliary image signal further has successive frames, each frame having a first and a second field; and the control circuit generates the quincunx subsampler control signal conditioning the quincunx subsampler to take samples in the first sample pattern at the beginning of each first field, and the second sample pattern after the switch time, and in the second sample pattern at the beginning of each second field, and the first sample pattern after the switch time.

3. The apparatus of claim 1, further comprising:

a field memory, coupled to the quincunx subsampler, for storing one field of quincunx subsampled auxiliary image samples at sequential write locations in synchronism with the auxiliary image signal, and retrieving previously stored subsampled samples from sequential read locations in synchronism with the main image signal; and wherein:

the control circuit calculates the switch time as being when the write location is the same as the read location.

4. The apparatus of claim 3, wherein:

the auxiliary image sample source comprises:
  a source of the auxiliary image signal, including a synchronization component; and
  an auxiliary timing signal generator, responsive to the auxiliary image signal synchronization component, for generating an auxiliary vertical synchronization signal; and the control circuit comprises:
  a comparator, responsive to the successive write locations and the successive read locations, for generating a signal when the write location is the same as the read location; and
  circuitry, responsive to the auxiliary vertical synchronization signal for generating the quincunx subsampler control signal to condition the quincunx subsampler to take samples in the one of the first and second sample patterns, and responsive to the comparator signal for generating the quincunx subsampler control signal to condition the quincunx subsampler to take samples in the other one of the first and second sample patterns.

5. Apparatus for combining an auxiliary image and a main image, comprising:

a source of a main image signal;

a source of samples representing an auxiliary image signal having successive fields;

a quincunx subsampler, coupled to the auxiliary image sample source, for selectively subsampling the auxiliary image samples in one of a first sample pattern taking samples at a first set of horizontal locations and a second sample pattern taking samples at a second set of horizontal locations substantially mid way between the first set of horizontal locations in response to a control signal;

a signal combiner, coupled to the quincunx subsampler and the main image signal source, for combining the main image signal and a signal representing the quincunx subsampled auxiliary image samples to generate a combined image signal; and a control circuit, for generating the quincunx subsampler control signal conditioning the quincunx subsampler to take samples in one of the first and second sample patterns at the beginning of each auxiliary image signal field, and in the other one of the first and second sample patterns after a switch time calculated so that the quincunx subsampled auxiliary image samples represented in the combined image signal all are taken by the same sample pattern;

a field memory, coupled to the quincunx subsampler for storing one field of quincunx subsampled auxiliary image samples at sequential write locations in synchronism with the auxiliary image signal, and retrieving previously stored subsampled samples from sequential read locations in synchronism with the main image signal; and wherein:

the control circuit calculates the switch time as being when the write location is the same as the read location; wherein:

the auxiliary image sample source comprises:
  a source of the auxiliary image signal, including a synchronization component; and
  an auxiliary timing signal generator, responsive to the auxiliary image signal synchronization component, for generating an auxiliary vertical synchronization signal; and the control circuit comprises:
  a comparator, responsive to the successive write locations and the successive read locations, for generating a signal when the write location is the same as the read location; and
  circuitry, responsive to the auxiliary vertical synchronization signal for generating the quincunx subsampler control signal to condition the quincunx subsampler to take samples in the one of the first and second sample patterns, and responsive to the comparator signal for generating the quincunx subsampler control signal to condition the quincunx subsampler to take samples in the other of the first and second sample patterns; and wherein:

the control signal generating circuitry comprises a S-R flip flop, having a set input terminal coupled to the comparator, a reset input terminal responsive to the auxiliary vertical synchronization signal, and a Q output terminal coupled to produce the quincunx subsampler control signal.

6. The apparatus of claim 3, wherein:

the auxiliary image signal further has successive frames, each frame having a first and a second field; and the control circuit generates the quincunx subsampler control signal conditioning the quincunx subsampler to take samples in the first sample pattern at the beginning of each first field, and the second sample pattern after the write location is the same as the read location, and in the second sample pattern at the beginning of each second field, and the first sample pattern after the write location is the same as the read location.

7. The apparatus of claim 6, wherein:

the auxiliary image sample source comprises:
  a source of the auxiliary image signal, including a synchronization component; and
  an auxiliary timing signal generator, responsive to the auxiliary image signal synchronization component, for generating an auxiliary field type signal indicating whether the auxiliary image signal field is a first field or a second field, and an auxiliary vertical synchronization signal; and the control circuit comprises:

a comparator, responsive to the successive write locations and the successive read locations, for generating a signal when the write location is the same as the read location; and circuitry, coupled to the comparator, and responsive to the auxiliary vertical synchronization signal for generating the quincunx subsampler control signal to condition the quincunx subsampler to take samples in the first sample pattern when the auxiliary field type signal indicates that the auxiliary image field type is a first field and in the second sample pattern when the auxiliary field type signal indicates that the auxiliary image field is a second field, and responsive to the comparator signal for generating the quincunx subsampler control signal to condition the quincunx subsampler to take samples in the second sample pattern when the auxiliary image field type signal indicates that the auxiliary image field type is a first field and in the first sample pattern when the auxiliary field type signal indicates that the auxiliary image field is a second field.

8. Apparatus for combining an auxiliary image and a main image, comprising:

a source of a main image signal;

a source of samples representing an auxiliary image signal having successive fields;

a quincunx subsampler, coupled to the auxiliary image sample source, for selectively subsampling the auxiliary image samples in one of a first sample pattern taking samples at a first set of horizontal locations and a second sample pattern taking samples at a second set of horizontal locations substantially mid way between the first set of horizontal locations in response to a control signal;

a signal combiner, coupled to the quincunx subsampler and the main image signal source, for combining the main image signal and a signal representing the quincunx subsampled auxiliary image samples to generate a combined image signal; and a control circuit, for generating the quincunx subsampler control signal conditioning the quincunx subsampler to take samples in one of the first and second sample patterns at the beginning of each auxiliary image signal field, and in the other one of the first and second sample patterns after a switch time calculated so that the quincunx subsampled auxiliary image samples represented in the combined image signal all are taken by the same sample pattern;

a field memory, coupled to the quincunx subsampler, for storing one field of quincunx subsampled auxiliary image samples at sequential write locations in synchronism with the auxiliary image signal, and retrieving previously stored subsampled samples from sequential read locations in synchronism with the main image signal; and wherein:

the control circuit calculates the switch time as being when the write location is the same as the read location; wherein:

the auxiliary image signal further has successive frames, each frame having a first and a second field; and the control circuit generates the quincunx subsampler control signal conditioning the quincunx subsampler to take samples in the first sample pattern at the beginning of each first field, and the second sample pattern after the write location is the same as the read location, and in the second sample pattern at the beginning of each second field, and the first sample pattern after the write location is the same as the read location; wherein:

the auxiliary image sample source comprises:

a source of the auxiliary image signal, including a synchronization component; and an auxiliary timing signal generator, responsive to the auxiliary image signal synchronization component, for generating an auxiliary field type signal indicating whether the auxiliary image signal field is a first field or a second field, and an auxiliary vertical synchronization signal; and the control circuit comprises;

a comparator, responsive to the successive write locations and the successive read locations, for generating a signal when the write location is the same as the read location; and circuitry, coupled to the comparator, and responsive to the auxiliary vertical synchronization signal for generating the quincunx subsampler control signal to condition the quincunx subsampler to take samples in the first sample pattern when the auxiliary field type signal indicates that the auxiliary image field type is a first field and in the second sample pattern when the auxiliary field type signal indicates that the auxiliary image field is a second field, and responsive to the comparator signal for generating the quincunx subsampler control signal to condition the quincunx subsampler to take samples in the second sample pattern when the auxiliary image field type signal indicates that the auxiliary image field type is a first field and in the first sample pattern when the auxiliary field type signal indicates that the auxiliary image field is a second field; and:

wherein the control signal generating circuitry comprises:

a S-R flip flop, having a set input terminal coupled to the comparator, a reset input terminal responsive to the auxiliary vertical synchronization signal, and a Q output terminal; and an exclusive-OR gate, having a first input terminal coupled to the Q output terminal of the S-R flip flop, a second input terminal responsive to the auxiliary field type signal, and an output terminal coupled to produce the quincunx subsampler control signal.

* * * * *